United States Patent
Hazama et al.

(10) Patent No.: US 6,495,092 B1
(45) Date of Patent: Dec. 17, 2002

(54) COMBUSTION APPARATUS AND MELTING FURNACE FOR NONFERROUS METALS

(75) Inventors: Katsumi Hazama; Keinosuke Masuki; Takayuki Inami, all of Hiroshima; Miki Takai, Nagoya; Eiichi Kashima, Nagoya; Tetsuya Yamada, Nagoya, all of (JP)

(73) Assignee: Sanken Sangyo Co., Ltd., Hiroshima (JP)

( * ) Notice: Subject to any disclaimer, the term of this patent is extended or adjusted under 35 U.S.C. 154(b) by 0 days.

(21) Appl. No.: 09/598,734

(22) Filed: Jun. 21, 2000

(30) Foreign Application Priority Data

Jun. 25, 1999 (JP) .............................. 11-179354
Apr. 17, 2000 (JP) ....................... 2000-114936

(51) Int. Cl.⁷ .............................................. C21B 7/22
(52) U.S. Cl. ......................... 266/156; 266/144; 432/19
(58) Field of Search ................... 266/156, 144, 266/139; 432/19, 180, 181, 182

(56) References Cited

U.S. PATENT DOCUMENTS

| | | | |
|---|---|---|---|
| 2,354,324 A | 7/1944 | Longenecker | |
| 4,676,744 A | 6/1987 | Wray et al. | |
| 4,818,844 A * | 4/1989 | Ward | 266/139 |
| 4,923,391 A * | 5/1990 | Gitman | 432/182 |
| 5,441,403 A | 8/1995 | Tanaka et al. | |
| 5,571,006 A | 11/1996 | Nakamachi et al. | |
| 5,823,769 A | 10/1998 | Joshi et al. | |
| 6,036,486 A * | 3/2000 | Argent et al. | 432/180 |
| 6,203,314 B1 * | 3/2001 | Philippe et al. | 432/19 |

* cited by examiner

Primary Examiner—Scott Kastler
(74) Attorney, Agent, or Firm—Frishauf, Holtz, Goodman & Chick, P.C.

(57) ABSTRACT

A combustion apparatus comprises a pair or more than two pairs of burner groups. Each burner group comprises one regenerator per a plurality of burners. In each pair of burner groups, a first burner group and a second burner group are fired alternately and waste heat produced when the first burner group is fired is stored in a regenerator of the second burner group. The stored waste heat is utilized to preheat the combustion air of the second burner group when the second burner group is fired. Similarly, waste heat produced when the second burner group is fired is stored in a regenerator of the first burner group, and the stored waste heat is utilized to preheat the combustion air of the first burner group when the first burner group is fired.

4 Claims, 7 Drawing Sheets

COMBUSTION APPARATUS AND MELTING FURNACE FOR NONFERROUS METALS

BACKGROUND OF THE INVENTION

1. Field of the Invention

The present invention relates to a combustion apparatus and a melting furnace, which includes a continuous furnace and a batch-type furnace, for melting nonferrous metals such as copper, aluminum, zinc and alloy, which comprises more than one pair of regenerative burners where waste heat produced by a first burner is stored in a regenerator of a second burner and the stored waste heat is utilized when the second burner is fired.

2. Description of the Related Art

Figure 6:
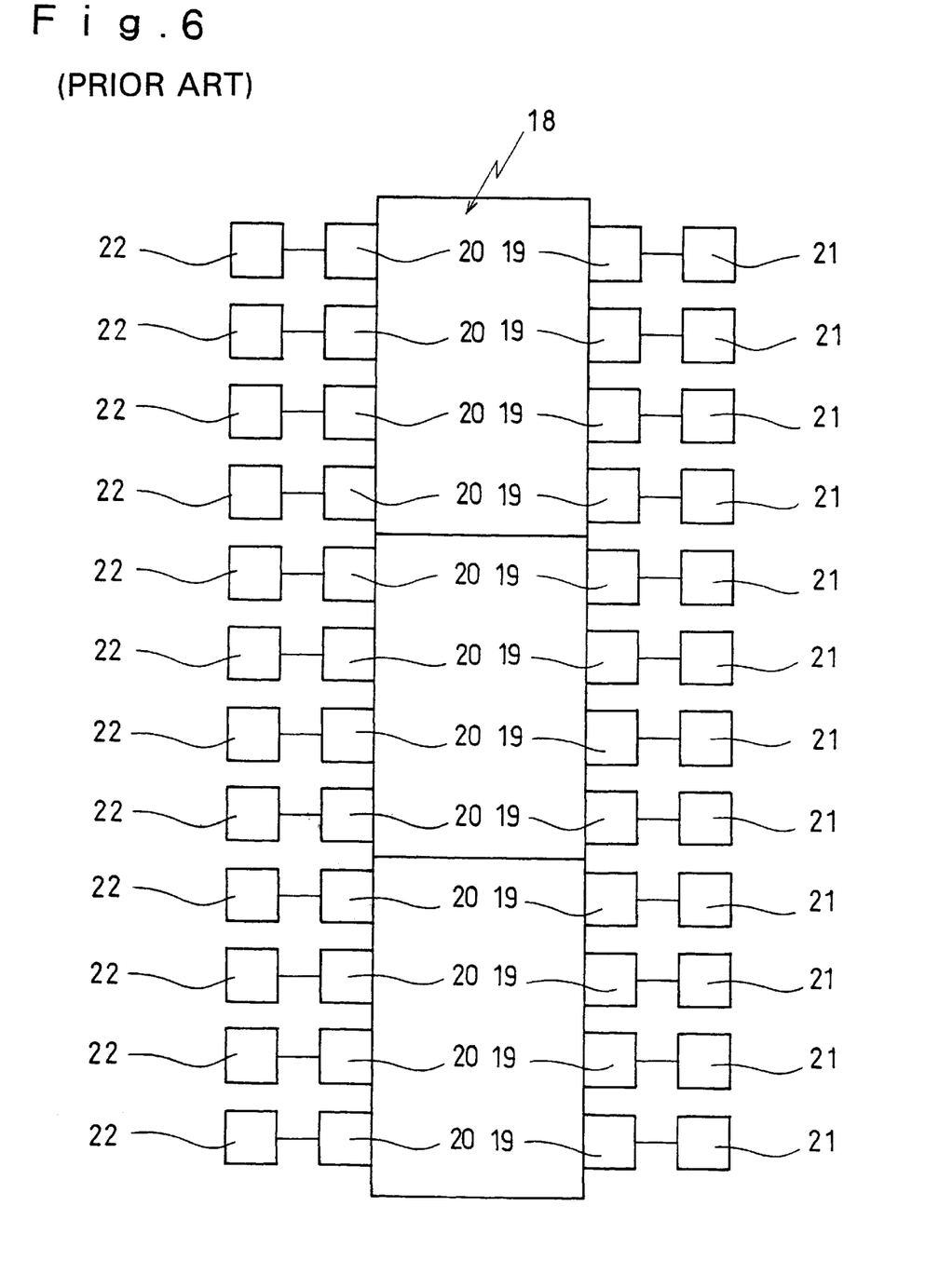
FIG. 6 is a plane view showing a conventional combustion apparatus.

There has been a combustion apparatus for melting and heating metals. The apparatus comprises a regenerative burner including a pair of burners 19, 20. The burners 19, 20 are fired alternately as such that when a first burner 19 is fired, a second burner 20 stores waste heat produced by the first burner 19, and the stored waste heat is used to preheat the combustion air of the burner 20 when the second burner 20 is fired. As illustrated in FIG. 6, the conventional combustion apparatus comprises one regenerator 21 or 22 per one burner 19 or 20, so that, for example, when there are provided eight (four pairs of) burners, the same number, eight, of regenerators need to be installed.

Figure 7:
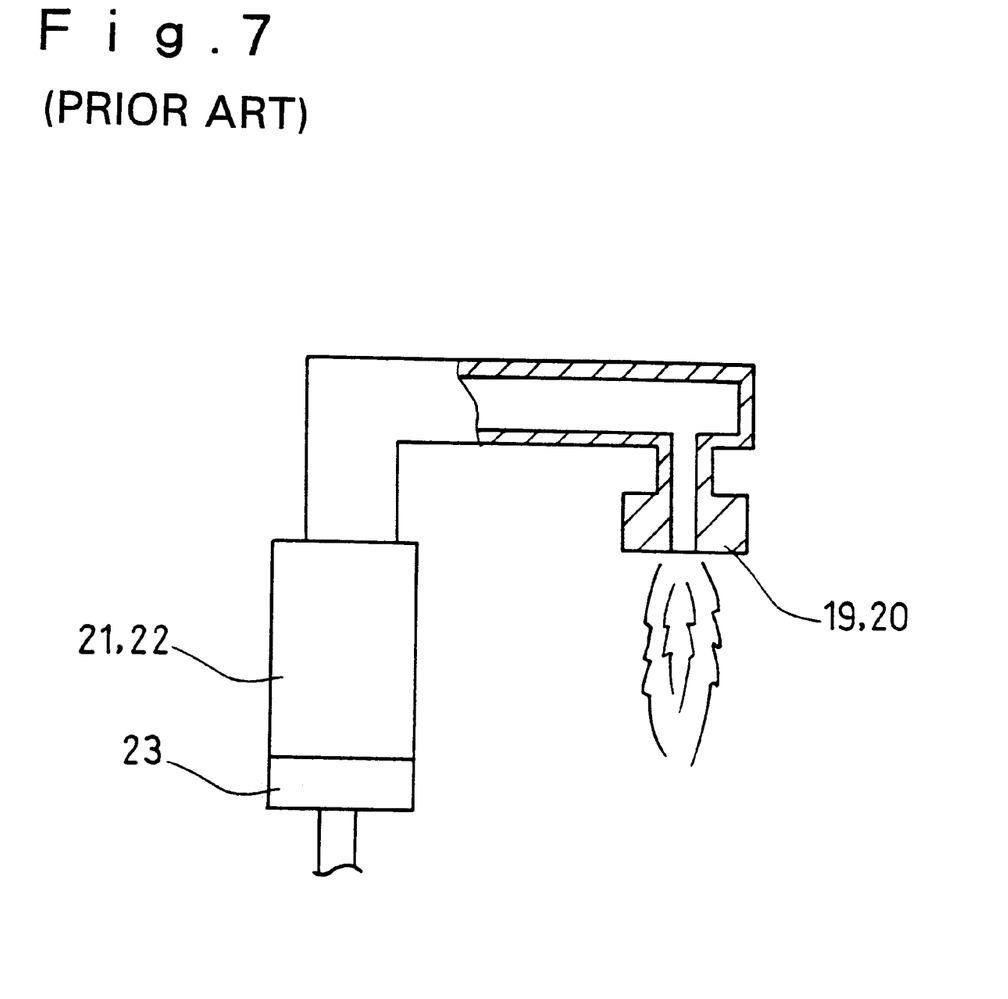
FIG. 7 is a partially sectional side view showing a conventional combustion apparatus.

As illustrated in FIG. 7, the conventional combustion apparatus comprises a regulating valve 23 at the upper stream of the regenerator 3 for controlling a volume of combustion air. With an operation of the regulating valve 23, the combustion of the burner 19 or 20 is to be controlled.

Conventionally, there has been a melting furnace for nonferrous metals having a regenerative burner. The regenerative burner comprises a pair of burners, each of which is fired alternately as such that when a first burner is fired, a second burner stores waste heat produced by the first burner. The stored waste heat is used to preheat the combustion air of the second burner when the second burner is fired.

Figure 8:
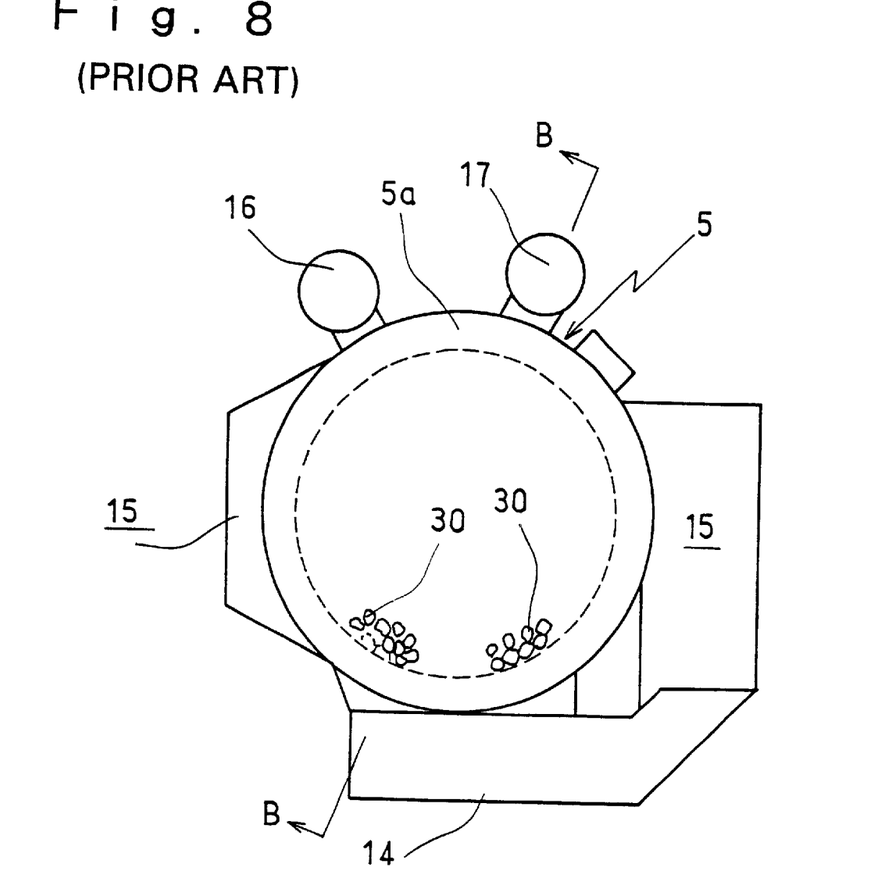
FIG. 8 is a plane view showing a conventional nonferrous metal melting furnace.
Figure 9:
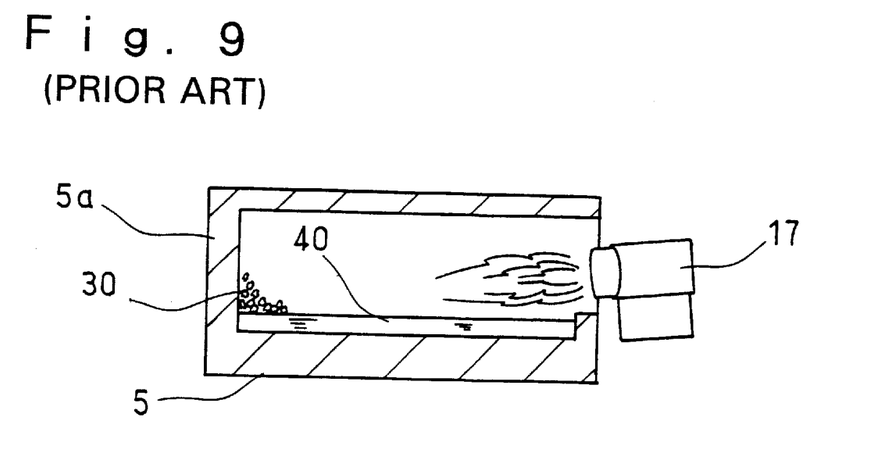
FIG. 9 is a sectional view of along line B—B in FIG. 8 that shows a conventional nonferrous metal melting furnace.

The conventional melting furnace for nonferrous metals will be described in detail referring to FIGS. 8 and 9. The melting furnace comprises a pair of regenerative burners 16, 17, at the side wall 5a of the furnace casing 5, and each burner 16 or 17 is integrated with a regenerator. This melting furnace operates as such that while a first burner 16 is fired, a second burner 17 is unfired but stores the waste heat produced by the first burner 16, as the waste heat is exhausted through a regenerator of the second burner 17. And, when the second burner 17 is fired, combustion air is provided through the regenerator of the second burner 17 and is preheated by the stored waste heat. By use of the waste heat, a thermal efficiency of the burners 16, 17 increases.

However, in the conventional combustion apparatus, each burner 19 or 20 is equipped with its own regenerator 21 or 22, so that when a large number of burners 19, 20 require to be installed in, for example, a continuous furnace 18, the same number of regenerators 21, 22 should also be installed. Therefore, the conventional combustion apparatus requires a much installation space as well as much cost and labor for an installation of the regenerators 21, 22 and a maintenance engineering thereof.

Further, according to the conventional melting furnace for nonferrous metals, each burner 16 or 17 is integrated with its own regenerator and is installed in the side wall 5a of the furnace casing 5. Therefore, an installation space and size of the burners 16, 17 becomes restricted, and as a result of this, a quantity and capacity of the burners 16, 17 are also restricted. Besides, it becomes necessary to enlarge the furnace casing 5 in its size, which induces a higher construction cost.

That is, if the conventional melting furnace is provided with a metal feeding device 14 for feeding aluminum, e.g., as well as an auxiliary apparatus 15, for example a pump, for circulation of the liquid metal at the side wall 5a of the furnace casing 5, in addition to the burners 16, 17 combined with the regenerators, an installation space of the burners 16, 17 is severely restricted. This becomes crucial when the furnace casing 5 is smaller in size. In such a case, it becomes necessary to select limited types of burners among many to install in the restricted small installation space. Also, a number of the burners to be installed is restricted. As a result of this, the burners 16, 17 tend to become unsatisfactory in capacity for efficiently melting and heating the nonferrous metal held in the furnace.

In order to resolve such drawbacks, it is desirable to enlarge the furnace casing 5 in size for broadening the installation space. However, this will bring a new drawback that the construction cost would over exceed.

Further, since the conventional melting furnace for nonferrous metals comprises the burners 16, 17 at the side wall 5a of the furnace casing 5, when the burners 16, 17 are fired, the combustion gas runs onto the surface of the liquid metal 40 in the nearly horizontal angle. Thus, the combustion gas does not wide spread over the surface of the liquid metal 40, heating only a local area of the surface. Besides, the jet flow of the combustion gas impinges on a certain area of the side wall 5a of the furnace. The certain area of the side wall 5a, where the jet flow of the combustion gas impinges on, becomes extremely high in temperature and a mass of nonferrous metal oxide 30 is produced thereabout and is ingrained and accumulated to the side wall 5a. Because of a mass production of the nonferrous metal oxide 30, the yield of melting decreases. At the same time, as the combustion gas impinges on the side wall 5a where the oxide has been accumulated, an operation life of the side wall 5a shortens and thus a maintenance cost thereof arises.

SUMMARY OF THE INVENTION

It is an object of the present invention to provide a combustion apparatus comprising one regenerator per a plurality of burners in order to save a installation space of the burners. It is also an object of the present invention to provide a combustion apparatus comprising an air regulating valve at each burner in order to individually control a combustion volume of each burner.

It is another object of the present invention to provide a melting furnace for nonferrous metals comprising burners combined with regenerators on the roof of the furnace in order not to restrict the size, disposition and installation space of the burners, which will increase a heat transfer efficiency, save a construction cost and a production of oxide as well as an increase in a life duration of the side wall 5a and a reduction of maintenance cost.

A combustion apparatus according to the present invention is characterized in that it comprises a pair or more than two pairs of burner groups. Each burner group comprises one regenerator per a plurality of burners. In each pair of burner groups, a first burner group and a second burner group are fired alternately and waste heat produced when the first burner group is fired is stored in a regenerator of the second burner group. The stored waste heat is utilized to preheat the combustion air of the second burner group when the second burner group is fired. Similarly, waste heat produced when the second burner group is fired is stored in a regenerator of the first burner group, and the stored waste heat is utilized to preheat the combustion air of the first burner group when the first burner group is fired.

The combustion apparatus comprises a regulating valve for controlling a volume of combustion air. The valve is installed on the side of each burner.

A melting furnace for nonferrous metals according to the present invention is used for melting any nonferrous metals and for holding the metal in a liquid form. The melting furnace is characterized in that it comprises a pair or more than two pairs of burner groups. Each burner group comprises one regenerator per a plurality of burners. In each pair of burner groups, a first burner group and a second burner group are fired alternately, and waste heat produced when the first burner group is fired is stored in a regenerator of the second burner group. The stored waste heat is utilized to preheat the combustion air of the second burner group when the second burner group is fired. In the same manner, waste heat produced when the second burner group is fired is stored in a regenerator of the first burner group, and the stored waste heat is utilized to preheat the combustion air of the first burner group when the first burner group is fired. The burner groups are installed on the roof of a furnace. High velocity jet flame or combustion gas ejected from each burner is directed right below to impinge on the nonferrous metal or the surface of the liquid metal in the furnace to transfer the heat.

The melting furnace for nonferrous metals according to the present invention is characterized in that each burner group comprises a primary fuel supplying system and a secondary fuel supplying system, as well as a whole required combustion air supplying system. Each burner group is installed on the roof of the furnace as distanced from each other. A supplying ratio of the primary fuel and the secondary fuel is regulated to control the combustion in the furnace for the purpose of controlling the variation of flame and for controlling the temperature distribution in the furnace.

A melting furnace for nonferrous metals is further characterized in that each burner group comprises a primary fuel supplying system and a secondary fuel supplying system, as well as a whole required combustion air supplying system. Each burner group is installed on the roof of the furnace as distanced from each other. A supplying ratio of the primary fuel and the secondary fuel is regulated to control the combustion in the furnace for the purpose of shifting or varying the heat flux and for varying or evening the temperature fields in the furnace.

According to a first aspect of the present invention, there is provided one regenerator per a plurality of burners. Therefore, it is possible to drastically save an installation space, cost and labor for installation and the maintenance engineering of regenerators.

According to a second aspect of the present invention, in addition to the advantage of the first aspect of the invention, each burner is provided with a regulating valve for controlling a volume of a combustion air. Therefore, it becomes possible to control a combustion volume of each individual burner to accurately control the temperature of the furnace or melting furnace.

According to a third aspect of the present invention, a melting furnace for nonferrous metals, a group of burners are installed on the roof of a furnace and they eject high velocity jet flame or combustion gas; directly below the roof. Therefore, it is possible to install a desired type of burners. That is, no auxiliary apparatus but a wide space is provided above the furnace casing, so that a desired number and type of burners are selected and installed without any restrictions. Accordingly, it is possible to properly melt the nonferrous metal in the furnace and hold the metal in a liquid form. Because of such advantage, there is no need to enlarge the furnace casing, thus saving a construction cost and labor.

Further, since the high velocity jet flame or combustion gas ejected from the burners impinges on the liquid metal surface at right angles, they spread all over the surface of the liquid metal, evenly heating the whole liquid metal and preventing any local area from overheating. Therefore, a generation of oxide is restrained and the decrease in the yield of melting is improved. Further, jet flows of the combustion gas evenly flow toward a side wall, so that the oxide does not accumulate at a specific area of the side wall. Therefore, the drawback regarding to a decrease of the life duration of the furnace is improved.

Further, according to a fourth aspect of the present invention, in addition to the advantage of the third aspect of the invention, it is possible to control a supplying ratio of primary fuel and secondary fuel in each burner group, and to selectively change the flame to control the temperature distribution in the furnace. Therefore, it becomes possible to maintain the inside of the furnace a desirable condition.

Further, according to a fifth aspect of the present invention, in addition to the advantage of the third aspect of the invention, a combustion volume of each burner group is controlled by adjusting a primary fuel and secondary fuel so as to shift or vary the heat flux in the vertical and horizontal directions and to vary or even the temperature fields in the furnace. Therefore, it becomes possible to maintain the inside of the furnace a properly desirable condition.

DESCRIPTION OF PREFERRED EMBODIMENT

Figure 1:
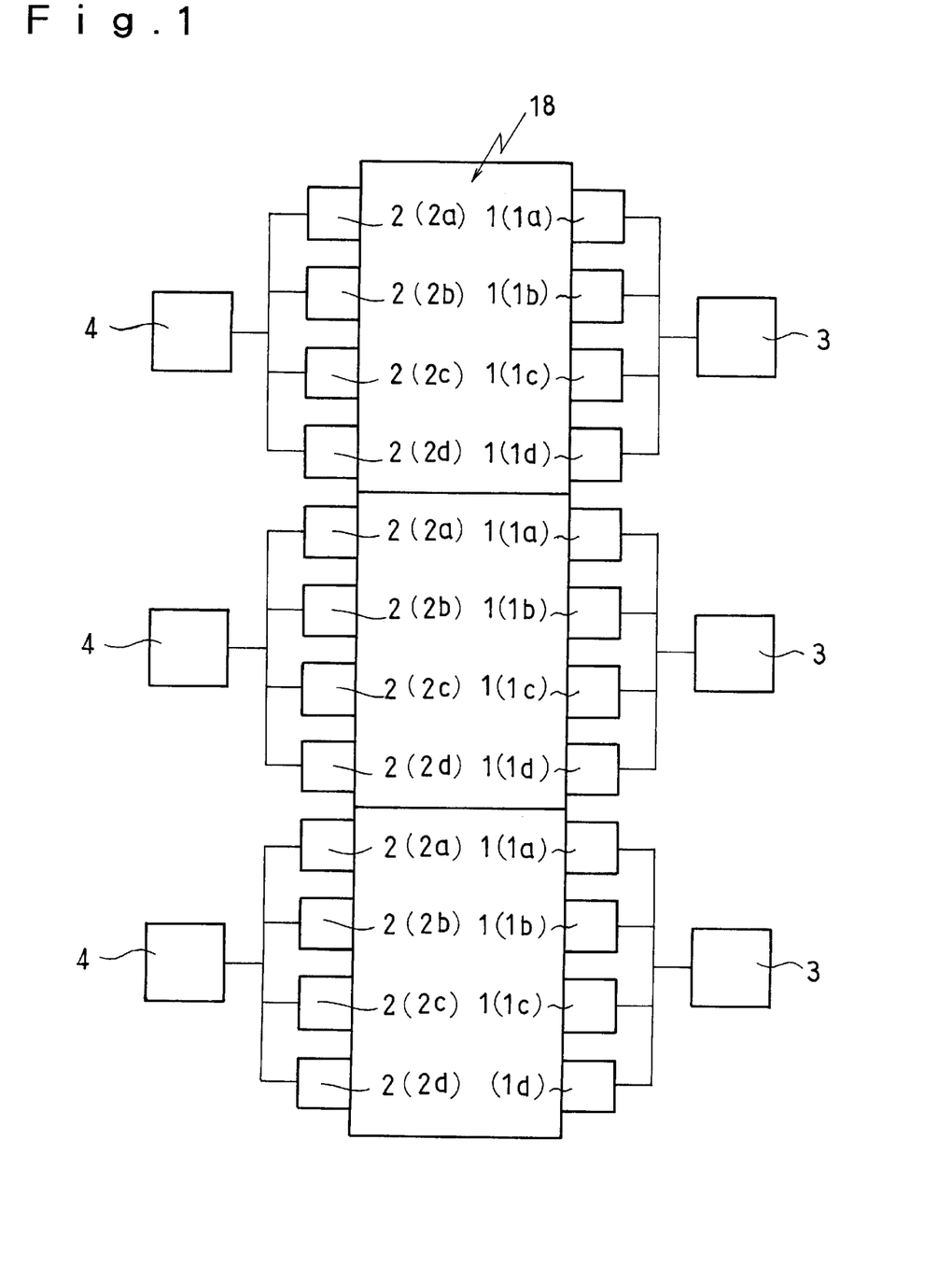
FIG. 1 is a schematic plane view that illustrates an embodiment of a combustion apparatus according to the present invention.

An embodiment of the present invention will be described referring to FIG. 1. FIG. 1 is a schematic plane view illustrating a combustion apparatus according to the present invention.

Figure 4:
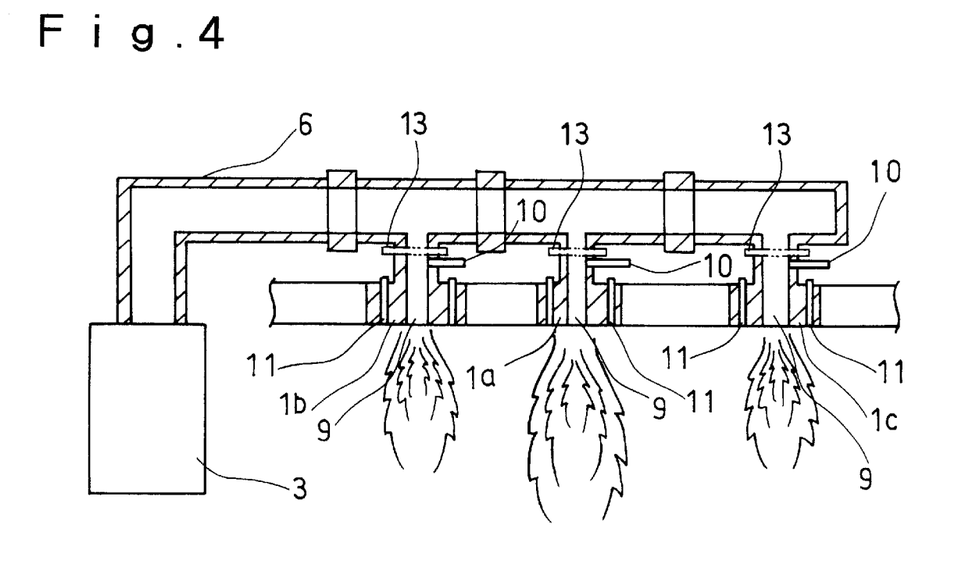
FIG. 4 is a schematic enlarged sectional view that illustrates a pair of burners installed in the nonferrous metal melting furnace shown in FIG. 2.

The combustion apparatus comprises a plurality of regenerative burner groups, and each regenerative burner group comprises one regenerator 3 or 4 per four burners 1a, 1b, 1c, 1d or 2a, 2b, 2c, 2d. Two regenerative burner groups 1, 2 make a pair, and each group is fired alternately. When a first burner group 1 is fired, a regenerator 4 of a second burner group 2 stores waste heat produced by the first group 1, and the stored waste heat is utilized to preheat the combustion air of the second burner group when the second burner group 2 is fired. In this embodiment, the combustion apparatus comprises three pairs of burner groups, which are six burner groups, and they are installed in a continuous furnace 18. A regulating valve 13 for controlling a volume of combustion air is provided at each burner side (see the regulating valve in FIGS. 4 and 5).

According to this combustion apparatus, when one burner group 1 (a first burner group) is fired, the other burner group 2 (a second burner group) is kept unfired but stores waste heat produced by the first burner group 1 in a regenerator 4 of the second burner group. When the second burner group 2 is fired, the stored waste heat is utilized to preheat the combustion air of the second burner group 2. By using the waste heat, combustion air is preheated, thus each of the burners 1a to 2d are efficiently fired. Similarly, the waste heat produced by the second burner group 2 is stored in a regenerator of the first burner group 1, and it is utilized to preheat the combustion air of the first burner group 1 when the first burner group 1 is fired.

The combustion apparatus comprises one regenerator 3 or 4 per four burners 1a–1d or 2a–2b, so that it becomes possible to reduce an installation space of the apparatus. It is also possible to drastically reduce a cost and labor needed for installation and a maintenance engineering of the regenerator 3, 4.

Further, a regulating valve 13 for controlling a volume of combustion air is secured on the side of each burner 1a–2d, so that an individual control of a combustion volume of each burner becomes possible.

The combustion apparatus in this embodiment is installed in a continuous furnace 18 though, it may be installed in other types of furnaces including a batch-type furnace as well as in various types of melting furnaces and other existing facilities.

Figure 2:
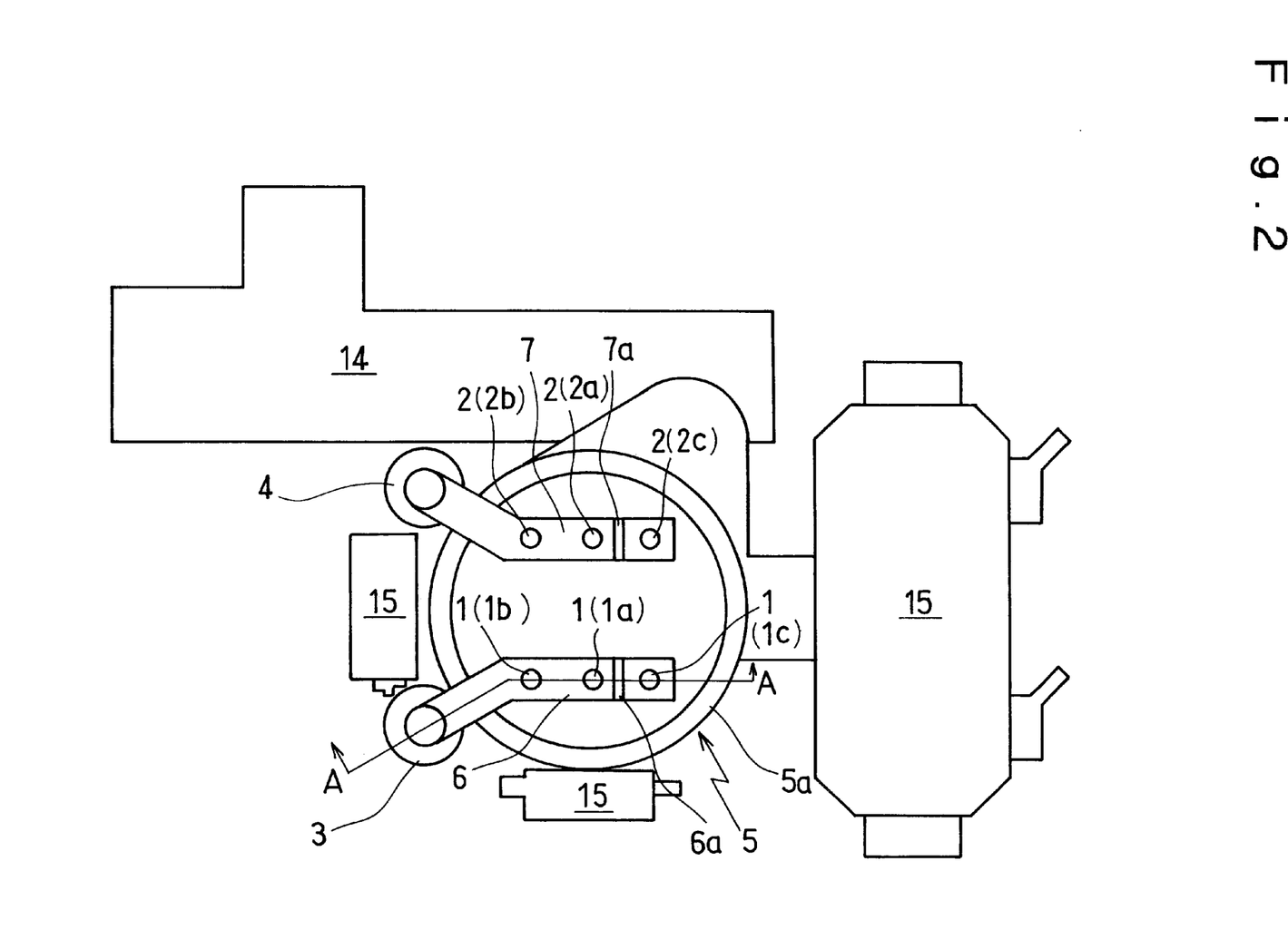
FIG. 2 is a schematic plane view that illustrates an embodiment of a nonferrous metal melting furnace according to the present invention.
Figure 3:
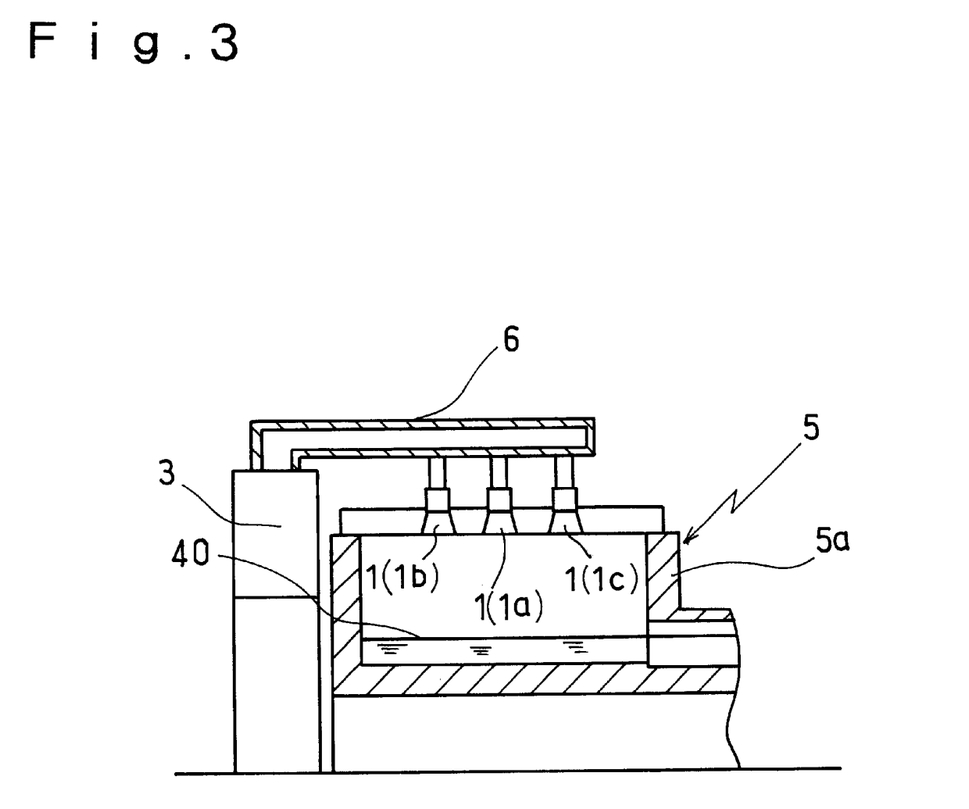
FIG. 3 is a schematic sectional view along line A13 A in FIG. 2.

Referring to FIGS. 2 and 3, an embodiment of a melting furnace for nonferrous metals according to the present invention will be described. FIG. 2 is a schematic plane view illustrating a melting furnace for nonferrous metals. FIG. 3 is a schematic sectional view along line A—A in FIG. 1. Same numerals are applied to portions identical to the portions shown in the prior art.

An embodiment of a melting furnace for nonferrous metals according to the present invention comprises a pair of burner groups 1, 2, where each group 1 or 2 is fired alternately. Waste heat produced by a first burner group while the same is fired is stored in a regenerator 4 of a second burner group 2, and the stored waste heat is utilized to preheat the combustion air of the second burner group 2 when the second burner group 2 is fired. The melting furnace melts a nonferrous metal or heats the metal to hold it in a liquid form in a furnace. In this embodiment, a pair of burner groups 1, 2 are installed on the roof of the furnace casing 5. Burners of each group 1, 2 eject high velocity jet flame or combustion gas down to the upper surface of the nonferrous metal or liquid metal and transfer the heat efficiently thereto. The nonferrous metal in the furnace in this embodiment is aluminum, but other nonferrous metals such as copper, zinc, tin or the like may be held and melted in the furnace.

Each burner group 1 or 2 comprises three burners 1a–1c or 2a–2c respectively, and each three burners 1a–1c or 2a–2c are connected in series by a connecting duct 6 or 7 and communicates to an corresponding regenerator 3 or 4 which are installed nearby the side wall 5a of the furnace casing 5. Each connecting duct 6 or 7 is interconnected with an expansion joint 6a or 7a in order to expand or contract corresponding to the high temperature heat. Along the side wall 5a of the furnace casing 5, there are provided a metal feeding device 14 and other auxiliary apparatus 15.

In such structured melting furnace for nonferrous metals, two burner groups 1, 2 are fired alternately to melt the aluminum in the furnace, holding it in a liquid form. When the first burner group 1 is fired, waste heat is produced by the same group 1. Then, the waste heat is stored in the regenerator 4 of the second burner group 2 while the waste heat is sucked into the regenerator 4. After completion of this process, the second burner group 2 is fired, while the first burner group 1 is unfired but stores waste heat exhausted out of the first burner group 1 and introduced into the regenerator 3. By repeating such process, the melting furnace efficiently melts the aluminum in the furnace and hold it in a liquid form.

According to this embodiment of the melting furnace for nonferrous metals, all the burner groups 1, 2 are installed on the roof of the furnace casing 5, therefore, it is possible to obtain a wider installation space for the burners. Thus, it becomes possible to install any desired size and number of burners in the furnace casing 5, which keeps the charged metal or liquid metal in the furnace a desired condition.

Further according to this embodiment, since the combustion gas ejected from the burner groups 1, 2 impinges on the liquid metal 40 in the furnace at right angles, the entire liquid metal 40 is evenly heated and aluminum oxide 30 is produced to the minimum.

Further, as the jet flow reaches evenly to each portion of the side wall 5a, the aluminum oxide 30 does not accumulate at a specific portion of the side wall 5a. Also, the combustion gas does not impinge on a specific portion of the side wall 5a. Therefore, a life duration of the furnace drastically lengthens.

Further, according to the embodiment of the melting furnace for nonferrous metals, there are provided three burners 1a–2c in each burner group 1 or 2 on the roof of the furnace casing 5, and there is provided a certain distance between adjacent burners. This melting furnace has such functions: it enables to optimize the heat flux in the furnace by controlling a combustion volume of each burner 1a–2c; it also enables to vary and even the temperature fields in the furnace by moving or shifting the heat flux in the vertical and horizontal directions.

That is, for example, by firing the burners 1a, 2a, which are distanced from the side wall 5a thus locating near the center of the furnace casing 5, so as to produce flame of big heat flux, the drawback regarding an accumulation of the oxide 30 at a certain portion of the side wall 5a will be improved. This will further lengthen the life duration of the furnace.

Figure 5:
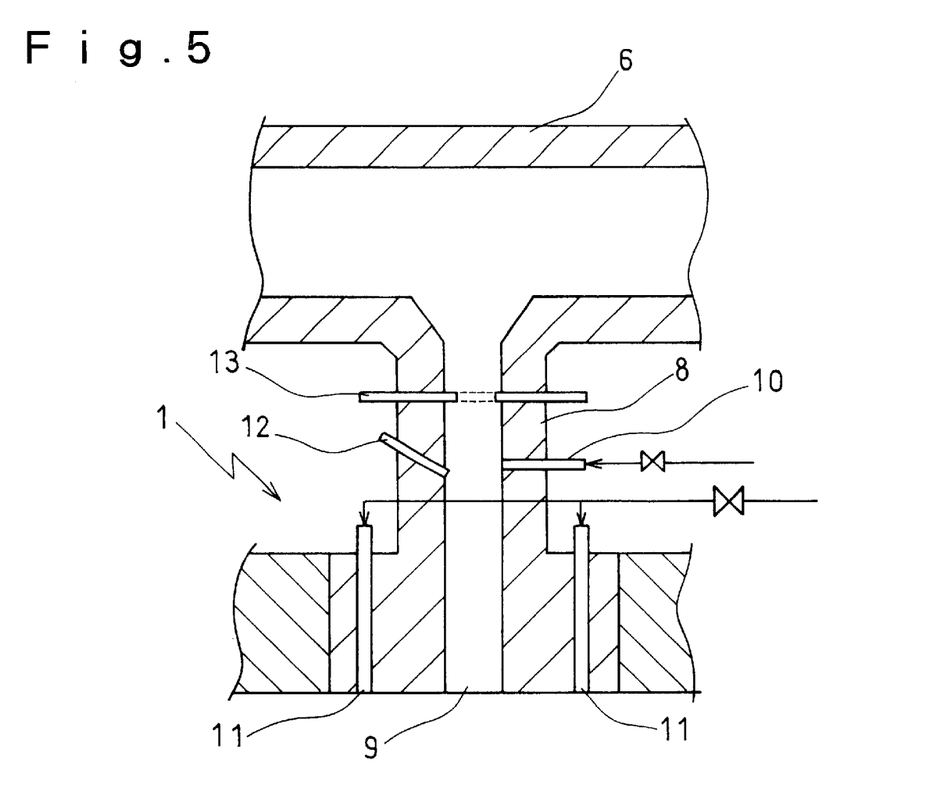
FIG. 5 is a schematic enlarged sectional view that illustrates an internal structure of each burner shown in FIG. 2.

In this embodiment of the melting furnace for nonferrous metals, each burner group 1 or 2 comprises an air nozzle 9 communicated with a primary fuel nozzle 10 in a burner tile 8, as well as a plurality of secondary fuel nozzles 11, 11 arranged in parallel nearby the port of the air nozzle 9. There are also provided a pilot burner 12 for ignition and a regulating valve 13 for controlling a volume of combustion air.

With such structure, there are provided three combustion systems. First, the air in the air nozzle 9 and the fuel supplied from the primary fuel nozzle 10 are fired in the burner tile 8. Second, the air in the air nozzle 9 and the fuel supplied from the secondary fuel nozzle 11 are combined and fired in the furnace. Third, the first and second systems are combined. Any combustion system out of three systems is selectively chosen. Further, by controlling a supplying ratio of the primary fuel and the secondary fuel for combustion, it becomes possible to selectively vary the flame to control a temperature distribution in the furnace. The primary fuel is supplied from the primary fuel nozzle 10, and the secondary fuel is supplied from the secondary fuel nozzle 11. Accordingly, it is possible to fire each burner group 1 or 2 as desired for a purpose of maintaining the furnace a preferable condition.

According to a first aspect of the present invention, there is provided one regenerator per a plurality of burners. Therefore, it is possible to drastically save an installation space, cost and labor for installation and the maintenance engineering of regenerators. This prominently increases productivity of the apparatus.

According to a second aspect of the present invention, in addition to the advantage of the first aspect of the invention, each burner is provided with a regulating valve for controlling a volume of combustion air. Therefore, it becomes possible to control a combustion volume of each individual burner to accurately control the temperature of the furnace or melting furnace. This also increases productivity of the apparatus.

According to a third aspect of the present invention, a melting furnace for nonferrous metals, a group of burners are installed on the roof of a furnace casing and they eject high velocity jet flame or combustion gas directly below the roof. Therefore, it is possible to install a desired type of burners. That is, no auxiliary apparatus but a wide space is provided above the furnace casing, so that a desired number and type of burners are selected and installed without any restrictions.

Accordingly, it is possible to properly melt the nonferrous metal in the furnace and hold the metal in a liquid form. Because of such advantage, there is no need to enlarge the furnace casing, thus saving a construction cost and labor. This also leads to better productivity.

Further, since the high velocity jet flame or combustion gas ejected from the burners impinges on the liquid metal surface at right angles, they spread all over the surface of the liquid metal, evenly heating the whole liquid metal and preventing any local area from overheating.

Therefore, a generation of oxide is restrained and the decrease in the yield of melting is improved. Further, jet flows of the combustion gas evenly flow toward a side wall, so that the oxide does not accumulate at a specific area of the side wall. Therefore, it is possible to lengthen the life duration of the furnace, which increases productivity of the melting furnace.

According to a fourth aspect of the present invention, in addition to the advantage of the third aspect of the invention, it is possible to. control a supplying ratio of primary fuel and secondary fuel in each burner group, and to selectively change the flame to control the temperature distribution in the furnace. Therefore, it becomes possible to maintain the inside of the furnace a desirable condition.

According to a fifth aspect of the present invention, in addition to the advantage of the third aspect of the invention, a combustion volume of each burner group is controlled by adjusting a primary fuel and secondary fuel so as to shift or vary the heat flux in the vertical and horizontal directions and to vary or even the temperature fields in the furnace. Therefore, it becomes possible to maintain the inside of the furnace a properly desirable condition.,

We claim:

1. A combustion apparatus comprising:

at least one pair of burner groups;

wherein each burner group consists essentially of a plurality of burners and one regenerator for the plurality of burners;

wherein in each pair of burner groups, a first burner group and a second burner group are adapted to be fired alternately;

wherein waste heat produced when said first burner group is fired is stored in the one regenerator of the second burner group and said stored waste heat is utilized to preheat combustion air of said second burner group when said second burner group is fired;

wherein waste heat produced when said second burner group is fired is stored in the one regenerator of the first burner group and said stored waste heat is utilized to preheat combustion air of said first burner group when said first burner group is fired; and wherein a regulating valve for controlling a volume of combustion air is installed on a side of each burner.

2. A melting furnace for melting nonferrous metals and for holding melted metal in a liquid form, said melting furnace comprising:

at least one pair of burner groups;

wherein each burner group consists essentially of a plurality of burners and one regenerator for the plurality of burners;

wherein in each pair of burner groups, a first burner group and a second burner group are adapted to be fired alternately;

wherein waste heat produced when said first burner group is fired is stored in the one regenerator of the second burner group and said stored waste heat is utilized to preheat combustion air of said second burner group when said second burner group is fired;

wherein waste heat produced when said second burner group is fired is stored in the one regenerator of the first burner group and said stored waste heat is utilized to preheat combustion air of said first burner group when said first burner group is fired; and wherein said burner groups are installed on a roof of the furnace and high velocity jet flame or combustion gas ejected from each burner is directed downward to impinge on charged metal or a surface of liquid metal in the furnace to thereby transfer heat.

3. A melting furnace for nonferrous metals as claimed in claim 2, wherein:

each burner group includes a primary fuel supplying system and a secondary fuel supplying system, as well as a combustion air supplying system;

each burner group is installed on the roof of the furnace spaced apart from each other; and a supplying ratio of primary fuel and secondary fuel is regulated to control combustion in the furnace for the purpose of controlling flame variation and temperature distribution in the furnace.

4. A melting furnace for nonferrous metals as claimed in claim 2, wherein:

each burner group includes a primary fuel supplying system and a secondary fuel supplying system, as well as a combustion air supplying system;

each burner group is installed on the roof of the furnace spaced apart from each other; and a supplying ratio of primary fuel and secondary fuel is regulated to control combustion in the furnace for the purpose of shifting or varying heat flux and for varying or evening temperature fields in the furnace.

* * * * *